Dec. 7, 1965         G. H. KASS                3,221,773
                     FLUID VALVE
Filed Oct. 23, 1961                         5 Sheets-Sheet 1
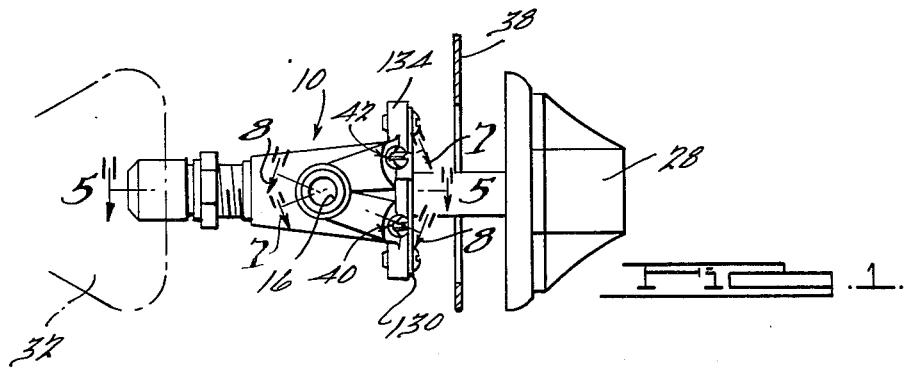
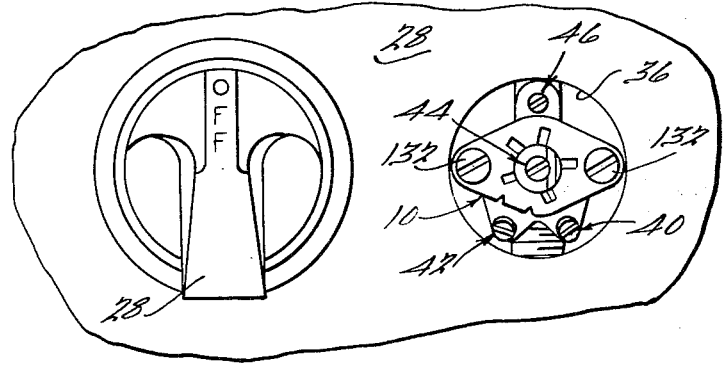
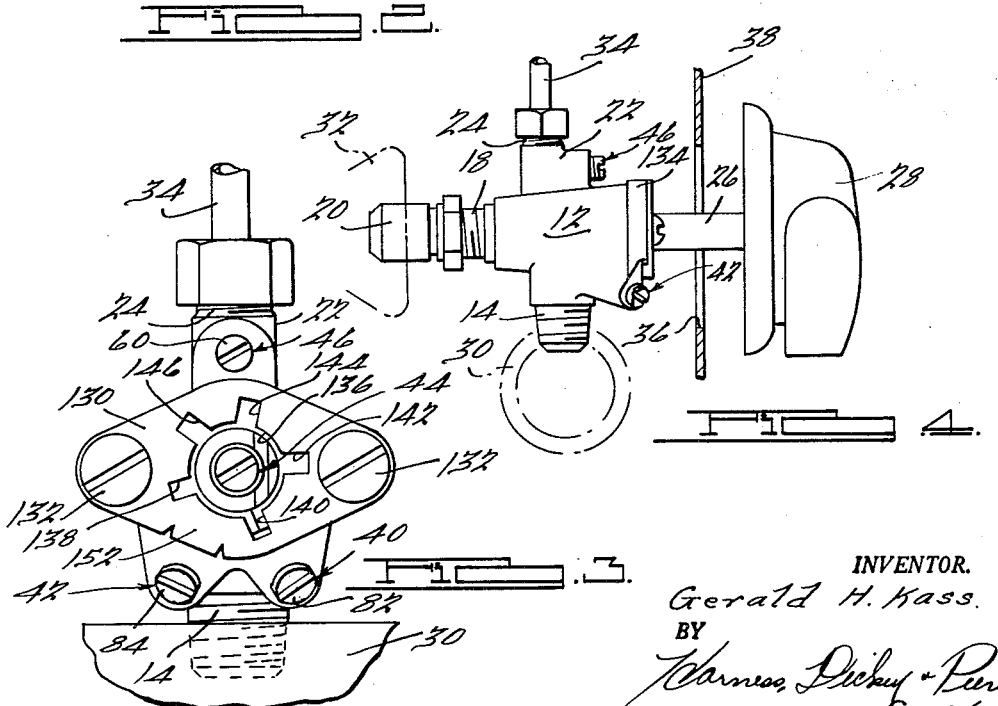
INVENTOR.
Gerald H. Kass.
BY
Harness, Dickey & Pierce.
ATTORNEYS.

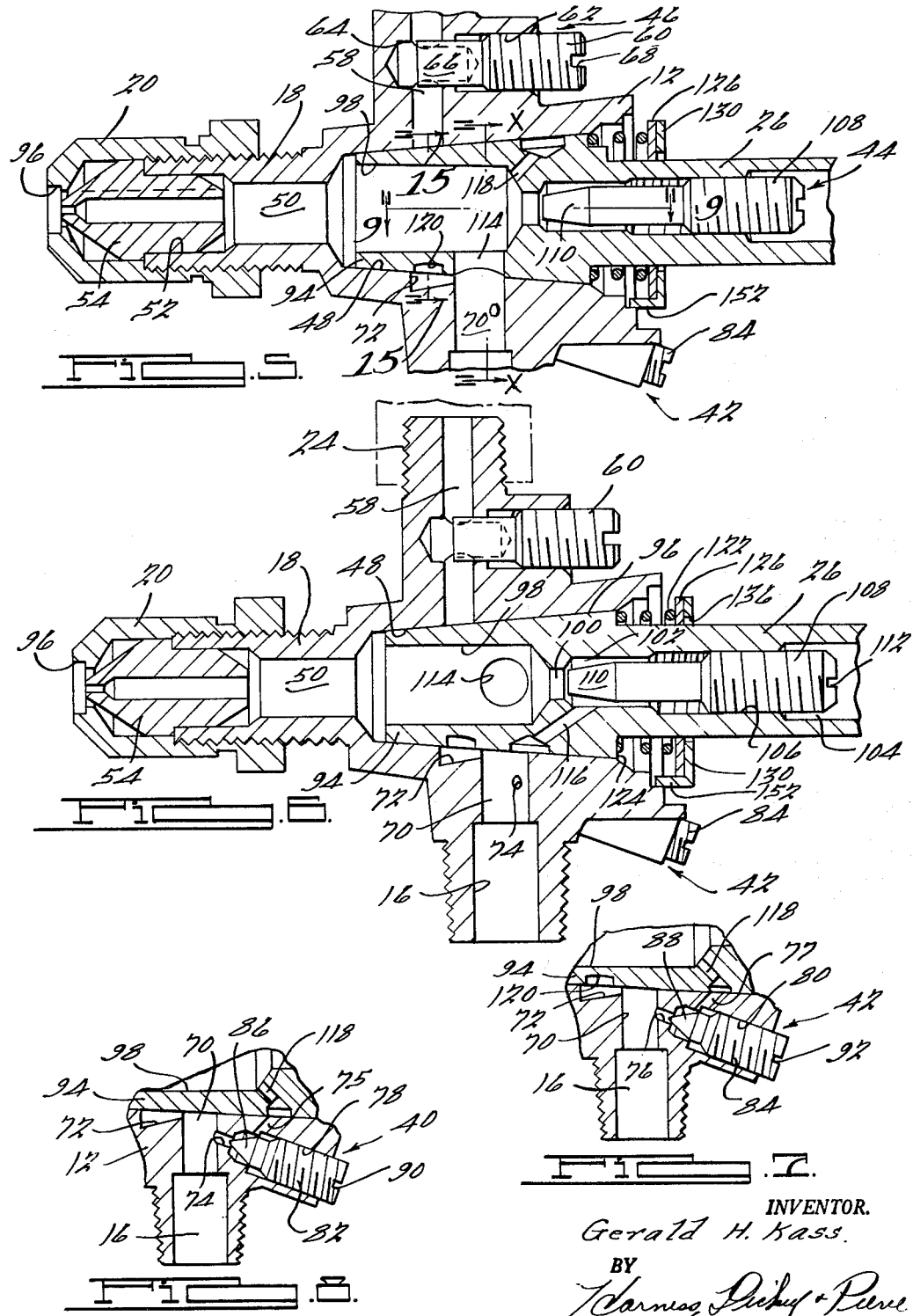

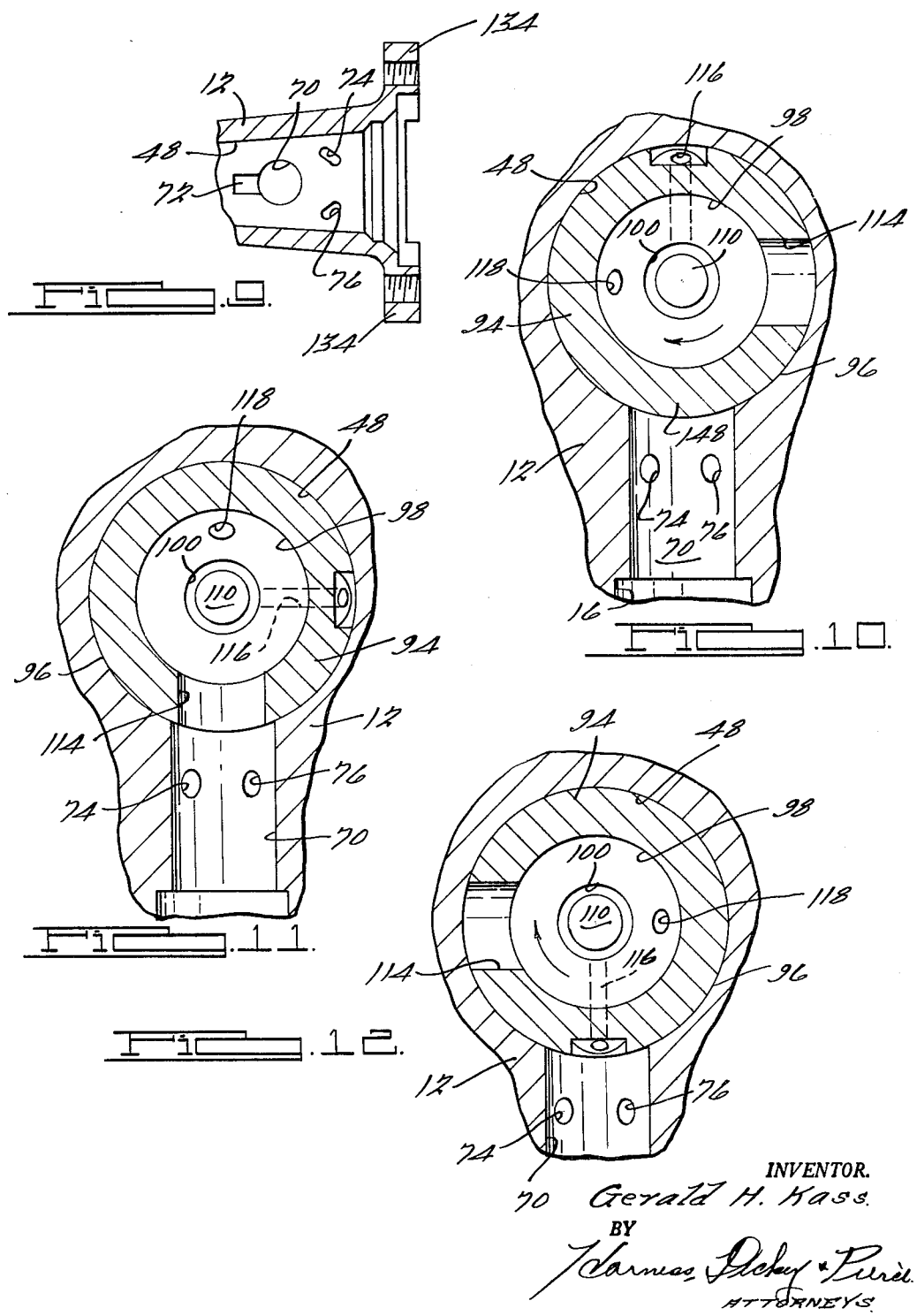

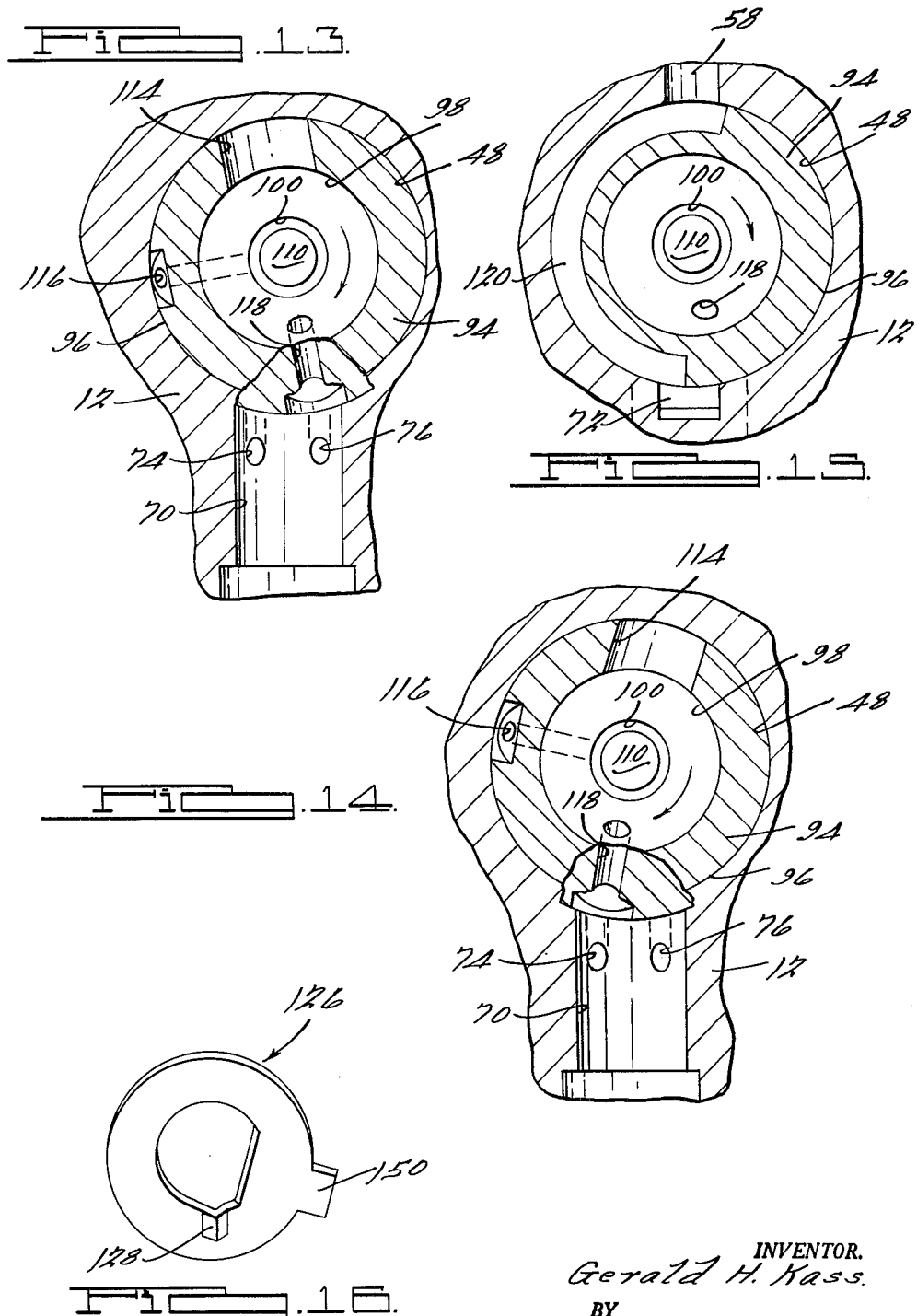

Dec. 7, 1965 G. H. KASS 3,221,773
FLUID VALVE
Filed Oct. 23, 1961 5 Sheets-Sheet 5

INVENTOR.
Gerald H. Kass
BY
Barnes Dickey & Pierce
ATTORNEYS.

United States Patent Office 3,221,773
Patented Dec. 7, 1965

3,221,773
FLUID VALVE
Gerald H. Kass, Garden City, Mich., assignor to Anderson
Brass Company, Detroit, Mich., a corporation of
Michigan
Filed Oct. 23, 1961, Ser. No. 146,926
5 Claims. (Cl. 137—637.4)

The present invention relates to multi-position fluid valves and more specifically to a multi-position valve of unique design particularly suited for use as a gas burner valve.

It is a primary object of this invention to provide a novel valve of extremely flexible, compact and simplified construction for supplying fluid at any one of a plurality of predetermined flow rates, each of which may be conveniently, independently and accurately preset to the desired value by the simple manipulation of the appropriate valve part.

Another object of the present invention lies in the provision of a unique gas burner valve having a rotatable valve element which may be rotated to as many as four different predetermined gas flow or heating positions, and which is provided with independently adjustable flow control means for accurately presetting and/or adjusting the gas flow rate at each of the heating positions. A related object resides in the provision of such a valve adapted to be mounted in a conventional gas range with the usual manually operable valve stem projecting through the standard stem receiving opening in the front or other panel of the range, the valve being so constructed that all of the flow control means thereon, except the one associated with a "full on" position, are readily accessible through the stem receiving opening in the range for convenient adjustment.

Yet a further object of this invention concerns the provision of a multi-position gas burner valve of the aforementioned type wherein there is provided auxiliary outlet means for supplying gas to a safety pilot flame in predetermined positions of the valve. A related object concerns the further provision of means of presetting and/or adjusting the flow rate of gas to the safety pilot flame, which means is readily accessible through the standard stem receiving opening in a conventional gas range when a valve of the present design is installed therein.

A still further object of the present invention resides in the provision of a unique, flexible rotary valve of the above type which achieves its flexibility utilizing a minimum number of passageways in the rotatable valve element, thus leaving a large area of imperforate surface for optimum sealing, as well as for the provision of additional port arrangements for special applications. A related object concerns the provision of a flexible construction which is such that valves having a number of different degrees of control, i.e., numbers of heating positions, may be constructed from standardized parts.

Another object is to provide a unique multi-position gas burner valve capable of supplying gas to a single burner at rates in a plurality of preadjustable increments from 12,000 B.t.u.'s per hour down to as low as 500 B.t.u.'s per hour, whereby a complete range of heating positions may be achieved with a single burner, thus obviating the need for a double burner construction with its attendant duplicity of parts. A related object concerns the provision of such a valve which is so constructed that flow regulation may be achieved with smooth "turn down" and no dead spots.

Yet another important object of this invention resides in the provision of a gas burner valve of the aforementioned type which, in all embodiments, fully complies with all of the strict requirements of AGA for valves of the same type, and which is compact enough for use with ranges of the most modern design.

These and other objects of the present invention will become apparent from consideration of the present specification taken in conjunction with the accompanying drawing in which there is illustrated an embodiment of the present invention, and wherein:

FIGURE 1 is a bottom plan view of a gas burner valve embodying the principles of the present invention;

FIGURE 2 is a front elevational view of a portion of a conventional gas range in which are installed valves constructed according to the present invention, one of the valve knobs being removed to illustrate the accessibility of the valve from outside the range;

FIGURE 3 is a front elevational view of a valve according to the present invention in a "full on" position;

FIGURE 4 is a side elevational view thereof;

FIGURE 5 is a longitudinal sectional view taken along line 5—5 in FIGURE 1, illustrating the valve in the "full on" position;

FIGURE 6 is a similar view illustrating the valve in a "medium" position;

FIGURE 7 is a fragmentary enlarged sectional view taken along line 7—7 in FIGURE 1 but illustrating the valve in a "simmer" position;

FIGURE 8 is a view similar to FIGURE 7 taken along line 8—8 in FIGURE 1 but illustrating the valve in a "keep warm" position;

FIGURE 9 is a fragmentary longitudinal sectional view looking along line 9—9 in FIGURE 5, but with the rotatable valve element removed to more clearly illustrate the interior of the valve housing;

FIGURES 10 through 14 are fragmentary transverse cross-sectional views taken along line X—X in FIGURE 5, illustrating the valve in the "off," "full on," "medium," "simmer" and "keep warm" positions, respectively;

FIGURE 15 is a fragmentary transverse cross-sectional view taken along line 15—15 in FIGURE 5 illustrating the valve in the "simmer" position;

FIGURE 16 is a perspective view of a part of the valve structure; and

Figure 17:
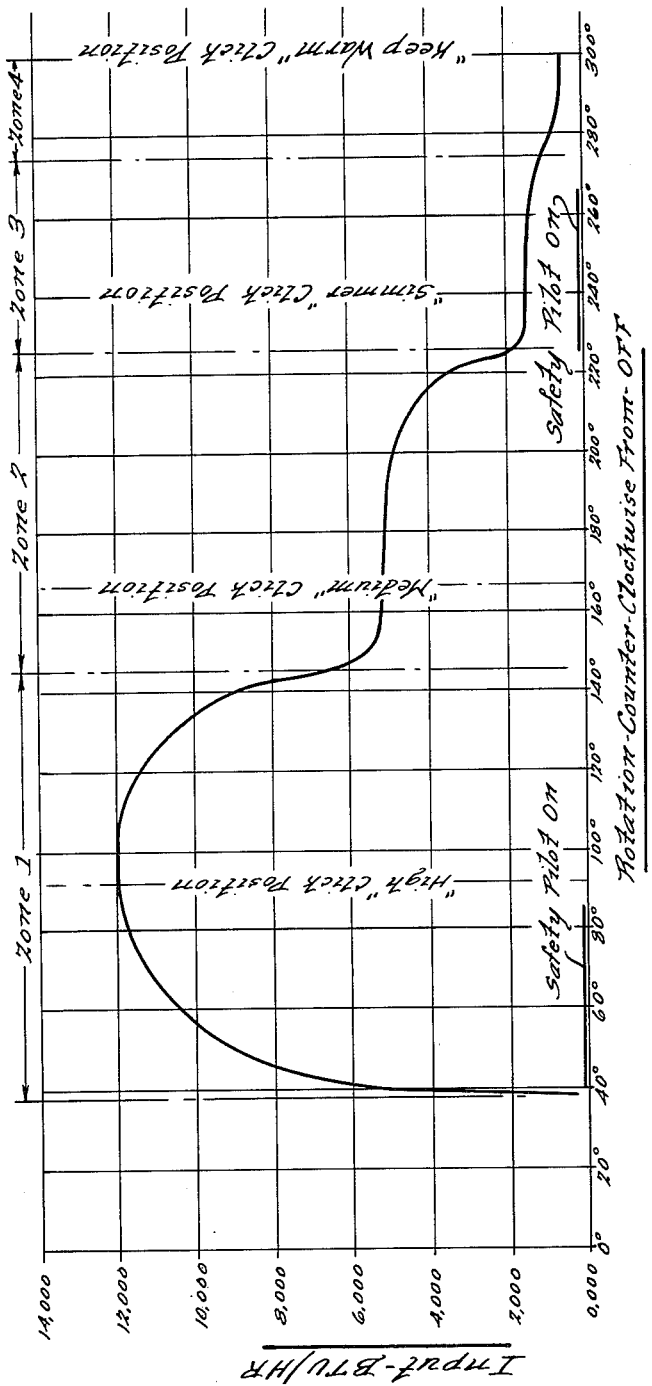
FIGURE 17 is a graph illustrating the flow curve of a valve embodying the principles of the present invention using 0.60 specific gravity, 1000 B.t.u. natural gas at 6" w.c.p. (regulated), corrected to 60° F. at 30" Hg.

As will become apparent, the present invention is primarily concerned with the provision of a unique valve which is so designed that tremendous flexibility in application and the greatest degree of gas flow control may be achieved without the actual valve structure becoming so large as to become impractical in modern gas ranges or so complicated as to be too expensive to market in competition with presently existing valves. The present compact design, of course, lends itself to constructions which fully comply with the strict AGA requirements for valves of the same type. In the present specification, the invention is embodied in a burner valve for a conventional gas range, the valve being capable of providing as many as four different heating positions, each of which may be individually and adjustably preset. Also provided is adjustable means for supplying gas to a safety pilot flame in a low flow rate position of the valve, so that if for any reason the main burner flame is extinguished the pilot flame will prevent the accumulation of an explosive or dangerous amount of gas from the extinguished burner. It is to be realized, however, that valves having fewer heating positions and/or a lesser degree of adjustment in each of the heating positions may also be made within the scope of the present invention, an embodiment having four heating positions and a pilot outlet being illustrated and described herein for purely exemplary purposes.

To best understand the capabilities of a valve according to the present invention, reference should be made to FIGURE 17, from which it may be seen that the present valve may be so constructed that when turned counterclockwise from an "off" position a "full on" position may be reached at approximately 90° with a flow rate of around 12,000 B.t.u.'s per hour, a "medium" position at around 165° with roughly a 5100 B.t.u.'s per hour flow rate, a "simmer" position at around 240° with around a 1440 B.t.u.'s per hour flow rate, and a 540 B.t.u.'s per hour "keep warm" position at around 300°. This would be a position giving a heat of about 160°–170° F. which will not continue the cooking process. In addition, gas may be supplied to a safety pilot during the "simmer" or 1440 B.t.u. position. Each of the aforementioned four positions, as well as the "off" position, is indicated to the operator of the valve by an audible click in each position, and by a spring detent arrangement which engages in each position to resist further rotation of the valve stem.

Generally speaking, the valve of the present invention comprises a valve housing having a valving surface partially defining a valve chamber therein and first and second passageways branching from a main inlet passageway and communicating with the valving surface, adjustable flow control means in each of the first and second inlet passageways, a main outlet passageway in the housing communicating with the valve chamber, a rotary valve element disposed in the chamber and having a surface sealingly engaging the valving surface, a valve stem on the valve element extending from the housing for manually rotating the valve element to a plurality of angular positions with respect to the housing, and passageway means in the valve element for alternately communicating the first and second inlet passageways with the main outlet passageway in different angular positions of the valve element.

One of the primary advantages of the present valve resides in its inherent flexibility, and one of the main design features contributing to this flexibility involves the provision of an arrangement wherein a main inlet passageway communicates with the valving surface within the housing in conjunction with a plurality of branch inlet passageways extending from the main inlet passageway adjacent the valving surface to the valving surface, the branch inlet passageways being angularly positioned in such a way that flow adjusting means may be provided therein accessible from outside the valve housing adjacent the valve stem, whereby adjustments may be made through the usual stem receiving opening in the front or other panel of a conventional range after the valve has been fully installed in the range, by simply removing the valve knob and inserting an appropriate tool through the opening.

Referring more particularly to the drawings, there is shown in FIGURES 1 through 4 installed in a conventional gas range a valve 10 constructed according to the present invention. Valve 10 comprises a housing 12 having a downwardly projecting threaded boss 14 through which passes a main gas inlet passageway 16. The rear end of housing 12 is provided with a threaded nipple 18 on which is threadably disposed an adjustable hood 20 of conventional design. Projecting from the upper surface of housing 12 is a projection 22 having an upwardly extending threaded boss 24. Projecting from the front of housing 12 is a rotatable valve stem 26 adapted to be manually rotated by means of a grippable knob 28 in the usual manner. As can be seen, valve 10 may be mounted by threadably positioning boss 14 within a suitable threaded aperture in the upper surface of a conventional gas supply line 30, with adjustable hood 20 projecting into a mixing tube 32 of conventional configuration for carrying the gas in a mixture of air to a burner. If desired, valve 10 may alternately be secured in a similar manner to the lower surface of the supply line. To boss 24 is threadably secured in the usual manner a gas line 34 for communicating gas to a safety pilot flame, as will be more apparent hereinafter. Stem 26 projects through the usual stem receiving opening 36 in a front panel 38 of the range. Significantly, opening 36 may be of the standard diameter, in the order of 1⅛", so that it may be hidden from the front of the range by using standard size knobs, as can be seen in FIGURES 2 and 4.

As will be described in greater detail hereinafter, the housing is provided with gas flowing adjusting means, generally indicated at 40, 42, 44 and 46, for accurately and independently presetting the flow rates of gas in the "keep warm," "simmer," "medium," and "pilot" positions of the valve, respectively. As will be clearly seen in FIGURE 2, each of the four flow control adjusting means are readily accessible through the conventional size opening 36 in front panel 38 of the range, whereby the valve may be accurately preset after it has been fully installed in the range by simply removing knob 28 and inserting a screwdriver through opening 36 to adjust the appropriate flow control means. Insofar as applicant is aware, no gas burner valve has heretofore been designed which is capable of being independently and adjustably set in so many different positions by such a simple operation. One of the primary features of the present design is that it lends itself to such convenient adjustment.

Considering the valve construction in greater detail, as particularly illustrated in FIGURES 5 through 9, housing 12 is provided with a centrally located valve chamber at least partially defined by a frusto-conical valving surface 48, the forward end of the valve chamber being open and the rearward end communicating with a main outlet passageway 50 disposed within threaded nipple 18. Fitted within a counterbore portion 52 within nipple 18 is a conventional tip insert 54 cooperating with an orifice 56 in adjustable hood 20 whereby the discharge flow rate through orifice 56 may be regulated by rotating hood 20 to vary its positioning with respect to nipple 18.

Projection 22 is provided with an auxiliary or pilot outlet passageway 58 for communicating gas from the valve chamber to pilot line 34. Adjustable flow control means 46 for varying the flow rate through passageway 58 comprises a pilot adjusting screw 60 threadably disposed within a threaded opening 62 in the forward portion of projection 22. Threaded opening 62 communicates with a coaxial non-threaded passageway 64 which is of a slightly greater diameter than and intersects pilot outlet passageway 58. The inner terminal end of pilot adjusting screw 60 is provided with a hollow cylindrical portion 66 which snugly fits within opening 64 and is adapted to move across passageway 58 to restrict the flow therethrough upon rotation of the adjusting screw. A transverse slot 68 is provided on the outer end of adjusting screw 60 for receiving a screwdriver, and as can be clearly seen in FIGURES 2 and 4 this end of the adjusting screw is clearly accessible through opening 36 in the front of the range.

Also communicating with valving surface 48 is the main inlet passageway 16, through a somewhat reduced portion 70. For reasons that will be more apparent hereinafter, at the intersection of passageway 70 and valving surface 48 the latter is provided with recess 72 communicating with passageway 70, as will be seen in FIGURES 6 and 9. Branching forwardly and obliquely from passageway 70 are a pair of branch inlet passageways 74 and 76, best illustrated in FIGURES 7, 8 and 10, communicating with passageways 75 and 77 respectively, which extend to valving surface 48 in the same radial plane. In coaxial communication with passageways 74 and 76 are enlarged threaded openings 78 and 80, respectively, in housing 12, the threaded openings having threadably disposed therein adjusting screws 82 and 84, respectively. Adjusting screws 82 and 84 are provided with conical end portions 86 and 88, respectively, adapted to project into passageways 74 and 76 to serve as needle valves to vary the flow of gas therethrough to passageways 75 and 77. The adjusting screws are provided with transverse slots 90 and 92 for receiving a screwdriver, and as can be clearly seen in FIGURES 2 and 4 the slotted ends of the adjusting screws are clearly accessible through the opening 36 at the front of the range. The axes of screws 82 and 84 need not pass through opening 36 in order that the screws be readily adjustable therethrough so long as adequate size slots are provided in ends of the screws.

Thus there are provided a plurality of symmetrical branch inlets extending forwardly and downwardly from the same level in the vertical main inlet passageway and communicating coaxially with flow control means, there also being provided secondary passageways communicating with the branch inlets at equidistant points downstream of the flow control means and extending upwardly and forwardly to the valving surface. Each of the secondary passageways intersects the valving surface in the same radial plane so that they can be served by a single passageway in the rotatable valve element, whereby a maximum amount of valve element surface is left for sealing purposes. By virtue of this arrangement of inlet passageways, it is possible to provide an extremely flexible valve having all the standard outside dimensions and a single inlet, so that it will fit within the usually allotted space in a range in the conventional manner. The arrangement is also such that passageways 74 and 76 may be easily drilled from outside the housing, and passageways 75 and 77 from inside the housing through the open forward end of the valve chamber.

The rotatably movable valve element of the present invention consists of a rotary valve plug 94 having a frusto-conical surface 96 thereon sealingly engaging valving surface 48, valve stem 26 being formed integrally with valve plug 94 for manually rotating the latter within the valve housing. The inner end of plug 94 is provided with an axial passageway 98 which is in permanent communication with main outlet passageway 50. At the opposite end of axial passageway 98 there is provided an intermediate passageway 100 communicating the axial passageway with a metering chamber 102, the diameter of chamber 102 being greater than the diameter of passageway 100. Valve stem 26 is hollow, having a first enlarged passageway 104 at the outer end thereof communicating with a threaded bore 106 communicating with metering chamber 102. Threadably disposed within threaded bore 106 is a threaded metering screw 108 having on the inner end a frusto-conical projection 110 and at the opposite end a transverse slot 112 for receiving a screwdriver to turn the adjusting screw, the latter being adjustable through passageway 104 in the valve stem from outside the range in which the valve is installed.

Valve plug 98 is provided with a radial passageway 114 extending from axial passageway 98 to a position on surface 96 which is axially positioned such that passage 114 may be brought into registry with main passageway 70 in one angular position of the plug. An oblique passageway 116 is provided in plug 94 for communicating metering chamber 102 with surface 96 of the valve plug at a point axially and radially positioned so as to be registrable with main passageway 70 in another angular position of the valve plug. An oblique passageway 118 is provided in the valve plug for communicating axial passageway 98 with surface 96 of the plug at a point axially and radially positioned so that it may alternately communicate with passageways 75 and 77 in further angular positions of the plug. Passageways 114, 116 and 118 are all spaced angularly from one another about the axis of rotation of the plug, and passageway 118 intersects surface 96 at a point axially spaced from the intersection of passageways 114 and 116 with surface 96. About the outer periphery of plug 94 is provided a circumferential groove 120 adapted to communicate main passageway 70, through recess 72, with passageway 58, as can be best seen in FIGURE 15, the circumferential groove lying in the same radial plane as recess 72 and passageway 58. The angular length of circumferential groove 120 is illustrated in FIGURE 15 and is such that it is operative to communicate gas to passageway 58 in certain positions of the valve, as will be more fully discussed hereinafter.

Valve plug 94 is urged into the housing with its frusto-conical surface 96 held in frictional wiping and sealing engagement with valving surface 48 by means of a compression spring 122 trapped on stem 26 and bearing inwardly upon a shoulder 124 formed by the juncture of the plug and stem. At its outer end spring 122 reacts against a stop and click washer 126 which is slidably but non-rotatably fitted upon stem 26. On its outer surface, washer 126 is provided with an outwardly projecting detent protrusion 128, as best seen in FIGURE 16. The remainder of the washer is flat, and detent protrusion 128 inclines towards the remaining flat surface in both peripheral directions from a portion of maximum height at its center. Washer 126, spring 122, and plug 94 are retained by a cap portion 130 secured by means of suitable screws, such as those at 132, to integral lateral flanges 134 formed on the valve housing. The central portion of cap 130 is pierced, as indicated at 136, for free clearance of stem 26, and radial slot-like extensions 138, 140, 142, 144 and 146 extend outwardly from clearance opening 136 in positions to receive detent protrusion 128 at each of the five predetermined positions of the valve, as can be best seen in FIGURE 3. Such slot portions and detent protrusion 128 are so proportioned that the detent enters each slot with an audible click sound when the valve is turned in a normal manner, although the protrusion can easily be cammed out of the slot upon further rotation of the valve plug. The interrelationship of these parts also provides indication of the attainment of the several predetermined valve positions since they may be felt as the valve plug is manually rotated.

Detent protrusion 128 enters slot 138 in the "off" position of the valve, in which position only a blank unperforated portion of the wall of plug 94, in the region designated 148, is aligned with main inlet passageway 70, as best seen in FIGURE 10. Slot portion 140 similarly indicates the attainment of the "full on" position in which passageway 114 registers fully with main inlet passageway 70, whereby gas may flow from there through axial passageway 98 to the main outlet passageway, as best illustrated in FIGURES 5 and 11. Slot 142 designates a "medium" position in which passageway 116 is in registry with inlet passageway 70, whereby gas may flow into metering chamber 102 to be metered by the axial position of the adjusting screw 108 and thence through axial passageway 98 to the main outlet passageway, as best seen in FIGURES 6 and 12. Slot 144 designates a "simmer" position in which passageway 118 registers with passageway 77, whereby gas may pass through branch inlet passageway 76 to be metered by adjusting screw 92 and thence through passageways 77, 118 and axial passageway 98 to the main outlet passageway, as best illustrated in FIGURES 7 and 13. Slot 146 designates a "keep warm" position in which passageway 118 registers with passageway 75, whereby gas may flow through branch inlet passageway 74 to be metered by adjusting screw 82, and thence through passageways 75, 118 and 98 to the main outlet passageway, as best illustrated in FIGURES 8 and 14.

The flow curve attainable with the present valve, indicating the extremely smooth turndown ranges having no dead spots, is illustrated in FIGURE 17. This curve also illustrates the relative angular relationship of the plug and housing in the various predetermined positions of the valve. At the top of the curve are illustrated the four zones in which the respective adjusting means are effective. In this regard it has been found that under the conditions in which the curve was made, adjusting screws 82 and 84 are effective to vary the flow rates in their respective passageways from zero to 6100 B.t.u.'s per hour, and adjusting screw 108 from zero to 8100 B.t.u.'s per hour. As will be appreciated, the flow rates in each of the respective positions of the valve may be individually preset to any desired valve, the values given herein being only exemplary.

As can be seen in FIGURE 15, when the valve is in the "simmer" position, circumferential groove 120 communicates inlet passageway 70, through recess 72, with passageway 58, from which it may flow under the control of adjuting screw 60 to a suitable pilot burner. The angular positions of the plug in which the pilot burner is supplied with gas are indicated in FIGURE 17, and a pilot is provided in the "simmer" position in order to meet certain safety requirements specifying that burners suitable for use with the subject valve be provided with safety pilots for reignition in the 1200 to 1600 B.t.u. per hour range. Because of its simplicity, the pilot control portion of the valve also serves to supply gas to the pilot burner for a short duration between the beginning of the "full on" position and the maximum "full on" position, as indicated in FIGURE 17. While it is really unnecessary to supply a pilot flame at this burner position, to do so is completely harmless and does result in a greatly simplified valve construction having a maximum degree of safety.

Washer 126 is also provided with a stop lug portion 150 projecting radially from its periphery and a fixed coacting stop lug portion 152 is formed on cap 130, portion 152 being bent inwardly and so proportioned and positioned as to stop the movement of the valve plug in each of the two extreme positions corresponding to those denominated by slot portions 138 and 146. Stem 26 is formed with a flat surface on one side which acts as keying means for knob 28 and washer 126.

There is thus provided a novel valve of extremely flexible application, having as many as four different heating positions in addition to a pilot position and adapted to be constructed in a very compact size. In all of the heating positions the gas flow may be individually preset to the desired amount based on existing conditions, it further being possible to individually adjust the gas flow rate in the pilot position and each of the burner positions except "full on" after the valve has been fully installed in a range, using only a screwdriver and working through the standard valve stem opening of conventional size in the range. If desired, the valve may be simplified by omitting projection 22 and the structure and passageways associated therewith, including passageway 58, to form a four-heat fully adjustable valve having no pilot positions. Further alternate or additional simplification might include the omission of the adjusting screw in the valve stem, placing passageway 116 in direct communication with axial passageway 98, so that a four-position valve may be obtained but wherein only three positions thereof may be individually preset. Other variations, of course, will be apparent to those skilled in the art, and the flexibility in the valve may be advantageously capitalized upon to adapt the valve for practically any valving application.

Thus, there is disclosed in the above description and in the drawings an exemplary embodiment of the present invention which fully and effectively accomplishes the objects thereof. However, it will be apparent that variations in details of construction may be indulged in without departing from the sphere of the invention as herein described or the scope of the appended claims.

What is claimed is:

1. A multi-position fluid valve comprising: a housing having a conical valving surface partially defining a tapered valve chamber therein and first and second inlet passageways communicating with said valving surface adjacent the larger end thereof; adjustable flow control means in each of said first and second inlet passageways; a main outlet passageway in said housing communicating with said chamber; a conical rotary valve element disposed in said chamber and having a surface sealingly engaging said valving surface; a valve stem on the larger end of said element extending from said housing for rotating said element to a plurality of angular positions with respect to said housing, each of said adjustable flow control means including a threadably adjustable valve member having an axis of movement which is oblique with respect to the axis of rotation of said valve element and being accessible from outside said housing adjacent said stem; and passageway means in said element for alternatively communicating said first and second inlet passageways with said main outlet passageway in various angular positions of said element.

2. A multi-position fluid valve comprising a housing having a conical valving surface partially defining a tapered valve chamber therein and first and second inlet passageways communicating with said valving surface adjacent the larger end thereof; adjustable flow control means in each of said first and second inlet passageways; a main outlet passageway in said housing communicating with said chamber; a conical rotary valve element disposed in said chamber and having a surface sealingly engaging said valving surface; a hollow valve stem on the larger end of said element extending from said housing for rotating said element to a plurality of angular positions with respect to said housing, each of said adjustable flow control means including a threadably adjustable valve member having an axis of movement which is oblique with respect to the axis of rotation of said valve element and being accessible from outside said housing adjacent said stem; first pasageway means in said element for alternatively communicating said first and second inlet passageways with said main outlet passageway in various angular positions of said element; means defining a third inlet passageway in said housing communicating with said valving surface; second passageway means in said element for communicating said third inlet passageway with said man outlet pasageway; and adjustable flow control means in said second passageway means, said last-mentioned flow control means being accessible for adjustment from outside said housing through said hollow valve stem.

3. A multi-position fluid valve comprising: a housing having a conical valving surface partially defining a tapered valve chamber therein and first and second inlet passageways communicating with said valving surface adjacent the larger end thereof; adjustable flow control means in each of said first and second inlet passageways; a main outlet passageway and an auxiliary outlet passageway in said housing communicating with said chamber; a conical rotary valve element disposed in said chamber and having a surface sealingly engaging said valving surface; a valve stem on the larger end of said element extending from said housing for rotating said element to a plurality of angular positions with respect to said housing, each of said adjustable flow control means including a threadably adjustable valve member having an axis of movement which is oblique with respect to the axis of rotation of said valve element and being accessible from outside said housing adjacent said stem; first passageway means in said element for alternatively communicating said first and second inlet passageways with said main outlet passageway in various angular positions of said element; means defining a third inlet passageway in said housing communicating with said valving surface; second passageway means in said element for communicating said third inlet passageway with said auxiliary outlet passageway; and adjustable flow control means in said auxiliary outlet passageway, said last-mentioned flow control means being accessible for adjustment from outside said housing adjacent said stem.

4. A multi-position fluid valve comprising: a housing having a conical valving surface partially defining a tapered valve chamber therein and first and second inlet passageways communicating with said valving surface adjacent the larger end thereof; adjustable flow control means in each of said first and second inlet passageways; a main outlet passageway in said housing communicating with said chamber; a conical rotary valve element disposed in said chamber and having a surface sealingly engaging said valving surface; a hollow valve stem on the larger end of said element extending from said housing for rotating said element to a plurality of angular positions with respect to said housing, each of said adjustable flow control means including a threadably adjustable valve member having an axis of movement which is oblique with respect to the axis of rotation of said valve element and being accessible from outside said housing adjacent said stem; first passageway means in said element for alternatively communicating said first and second inlet passageways with said main outlet passageway in various angular positions of said element; means defining a third inlet passageway in said housing communicating with said valving surface; second passageway means in said element for communicating said third inlet passageway with said main outlet passageway; adjustable flow control means in said second passageway means, said last-mentioned flow control means being accessible for adjustment from outside said housing through said hollow valve stem; third passageway means in said element for communicating said third inlet passageway with said auxiliary outlet passageway; and adjustable flow control means in said auxiliary outlet passageway, said last-mentioned flow control means being accessible for adjustment from outside said housing adjacent said stem.

5. A multi-position fluid valve comprising: a housing having a conical valving surface partially defining a tapered valve chamber therein; a main inlet passageway communicating with said valving surface; first and second inlet passageways branching from said main inlet passageway and communicating with said valving surface adjacent the larger end thereof; adjustable flow control means in each of said first and second inlet passageways; a main outlet passageway in said housing communicating with said chamber; a conical rotary valve element disposed in said chamber and having a surface sealingly engaging said valving surface; a valve stem on the larger end of said element extending from said housing for rotating said element to a plurality of angular positions with respect to said housing, each of said adjustable flow control means including a threadably adjustable valve member having an axis of movement which is oblique with respect to the axis of rotation of said valve element and being accessible from outside said housing adjacent said stem; and passageway means in said element for alternatively communicating said main, first and second inlet passageways with said main outlet passageway in various angular positions of said element.

References Cited by the Examiner
UNITED STATES PATENTS

| | | | |
|---|---|---|---|
| 2,162,233 | 6/1939 | Schoenberger | 137—625.12 |
| 2,284,994 | 6/1942 | Stuckenholt | 137—625.12 |
| 2,299,624 | 10/1942 | Harper | 137—625.12 |
| 2,561,531 | 7/1951 | Mueller | 137—637.4 XR |
| 2,650,614 | 9/1953 | Brumbaugh | 137—637.4 |
| 2,652,226 | 9/1953 | Huff | 251—310 XR |
| 2,655,177 | 10/1953 | Ryon | 137—625.12 XR |
| 2,707,971 | 5/1955 | Lamar | 137—614.17 XR |
| 3,001,547 | 9/1961 | Brumbaugh | 137—614.17 |

M. CARY NELSON, *Primary Examiner.*

LAVERNE D. GEIGER, *Examiner.*